United States Patent [19]

Linton et al.

[11] Patent Number: 4,992,281
[45] Date of Patent: * Feb. 12, 1991

[54] ANIMAL FEED SUPPLEMENT

[75] Inventors: John H. Linton; Nick Hussar, both of London, Canada

[73] Assignee: Ogilvie Mills Ltd., Canada

[*] Notice: The portion of the term of this patent subsequent to Dec. 4, 2001 has been disclaimed.

[21] Appl. No.: 339,658

[22] Filed: Apr. 18, 1989

Related U.S. Application Data

[60] Division of Ser. No. 47,496, May 6, 1987, Pat. No. 4,859,485, which is a continuation of Ser. No. 883,422, Jul. 14, 1986, abandoned, which is a continuation of Ser. No. 673,399, Nov. 20, 1984, abandoned, which is a continuation of Ser. No. 387,476, Jun. 11, 1982, Pat. No. 4,486,451, which is a continuation of Ser. No. 222,029, Jan. 2, 1981, abandoned.

[51] Int. Cl.$^5$ .............................................. A23B 1/00
[52] U.S. Cl. ...................................... 426/31; 426/49; 426/54; 426/61; 426/630; 426/807
[58] Field of Search ..................... 426/31, 49, 53, 54, 426/61, 623, 630, 807

[56] References Cited

U.S. PATENT DOCUMENTS

| | | | |
|---|---|---|---|
| 2,349,818 | 5/1944 | Petzer | 99/9 |
| 2,595,181 | 4/1952 | Vincent | 426/54 |
| 2,881,075 | 4/1959 | Lockmiller et al. | 426/54 |
| 2,965,489 | 12/1960 | Clickner | 99/9 |
| 3,875,304 | 4/1975 | Hunt et al. | 426/31 |
| 3,950,560 | 4/1976 | Rahman et al. | 426/468 X |
| 4,055,667 | 10/1977 | Linton et al. | 426/62 |
| 4,171,383 | 10/1979 | Chwalek et al. | 426/623 |
| 4,181,534 | 1/1980 | Headley | 127/67 |
| 4,181,748 | 10/1979 | Chwalek | 426/623 |
| 4,247,481 | 1/1981 | Nelson | 426/54 |
| 4,486,451 | 12/1984 | Linton et al. | 426/31 |
| 4,491,599 | 1/1985 | Citterio | 426/331 |

FOREIGN PATENT DOCUMENTS

| | | | |
|---|---|---|---|
| 959332 | 12/1974 | Canada | 99/34 |
| 1323187 | 4/1962 | France | 426/468 |
| 123555 | 12/1971 | Norway | 426/468 |

OTHER PUBLICATIONS

Morrison "Feeds & Feeding", Morrison Publishing Co., 1957, pp. 423–427.

Primary Examiner—R. B. Penland
Attorney, Agent, or Firm—Fisher, Christen & Sabol

[57] ABSTRACT

The invention provides a highly nutritional unfermented medium protein animal feed supplement by admixing wet corn bran having an abnormally high moisture content with concentrated corn steep to form a moist cohesive but friable mass, the process eliminating a significant proportion of the energy used in and pollution occasioned by prior art process. In a modification, the above unfermented product is subjected to a natural fermentation stage resulting in a fermented supplement which is microbiologically and gravitationally stable for an extended period of time. One further advantage of the present invention is that the corn bran and steep liquor from a corn wet milling plant can be used in the specific amounts as actually produced in the normal operation of the plant, thereby allowing plant efficiencies to be maintained.

5 Claims, No Drawings

ANIMAL FEED SUPPLEMENT

This application is a divisional of application Ser. No. 07/047,496 filed May 6, 1987, now U.S. Pat. No. 4,859,485. This application Ser. No. 07/047,496 is itself a continuation of application Ser. No. 06/883,422 filed July 14, 1986 and now abandoned. This application Ser. No. 06/883,422 is itself a continuation of application Ser. No. 06/673,399 filed Nov. 20, 1984 and now abandoned. This application Ser. No. 06/673,399 is itself a continuation of application Ser. No. 06/387,476 filed June 11, 1982, now U.S. Pat. No. 4,486,451. This application Ser. No. 06/387,476 is itself a continuation of application Ser. No. 06/222,029 filed Jan. 2, 1981 and now abandoned.

BACKGROUND OF THE INVENTION

Many industrial processes produce a variety of by-products which have significant potential forms as an animal feed or animal feed supplement. For example, the alcoholic brewing industry produces spent yeast as a by-product, this material containing a relatively larger portion of proteinaceous nitrogen and some vitamins, especially vitamin B and consequently the product is used as a protein supplement in animal feeds. Refer, for example, to Applicant's U.S. Pat. No. 4,055,667 and also Canadian Patent No. 959,332. In addition, the second major by-product of the brewing industry, namely spent brewers' grains, is also utilizable as an animal feed—refer for example to U.S. Pat. No. 3,875,304. A further industry which produces a large volume of by-products also utilizable as animal feeds is the wet corn milling industry, the two major by-products being corn steep water and wet corn bran. The former comprises the condensed corn extractives "steep liquor or water" resulting from the wet milling manufacture of corn starch or syrup which are collected and condensed generally to about 50% solids by evaporation. All of the soluble nutrients in corn grain (for example dissolved vitamins, minerals and other solubles or dispersible nutrients) are contained in the steep water. The corn steep water is handled and stored in tanks and treated in a manner similar to other liquid feed ingredients. The corn steep water is an economical source of protein being equivalent on a dry basis to 44% soybean meal. It is also an excellent source of energy and phosphorus and the dissolved nutrients from the corn which, if not, as is usual, reduced in availability bound to subsequent process steps, would be readily available to the animals. A typical proximate analysis of corn steepwater is as follows:

| | Crude | | | | | |
|---|---|---|---|---|---|---|
| | Protein | Fat | Fibre | Ca | P | ASH |
| 50% Dry Matter | 22.5% | 0 | 0 | 0.1% | 0.6% | 3.9% | and more detailed analyses are readily available in the literature. It may be noted that corn steep liquor per se is quite stable microbiologically and consequently presents no real problems on that account during storage. Wet corn bran comprises that part of the commercial shelled corn remaining after the extraction of the larger portion of starch, gluten and germ by the processes employed in the wet milling manufacture of the corn starch or syrup prior to drying. (It does not, of course, include the extractives i.e. steep water, refer to above.) The product constitutes the corn kernels hull and fibrous particles, and, when utilized alone, may contain an organic acid for extending its shelf life, since the product is extremely prone to microbial degradation. It has a high propensity to heating resulting in significant mold growth within a short period of time, even about twenty-four hours or so, depending on storage conditions. Wet corn bran as exiting the wet corn wet milling process contains 65% moisture and this is usually reduced to about 10% by drying and it can then be used for feed in that condition. A typical analysis of wet corn bran is as follows:

| | Crude | | | | | |
|---|---|---|---|---|---|---|
| | Protein | Fat | Fibre | Ca | P | Ash |
| 100% Dry Matter | 11.5% | 5.0% | 10.0% | 0.05% | 0.20% | 2.2% |

For a short term feeding of wet corn bran containing an organic acid preservative, a pit silo, a cement slab or a simply constructed wooden box is quite satisfactory to contain the product. Protection from the elements, particularly heavy rains, is highly desirable since the preserving acid may be leached out resulting in the product being subject to spoilage. Wet corn bran is mainly an economic source of energy in ruminant rations but also contributes about 11% protein on a dry matter basis. Both wet corn bran and corn steep liquor have relatively low solid contents, about 35% and 50% respectively, in the state they usually exit the milling process and are not easily or conveniently utilized in that form. In particular, such corn steep liquor when used as an ingredient in traditional liquid feed supplements is subject to re-crystallization and other handling problems. On the other hand bran fibre at the 35% d.m. solids level has a low bulk density and does not compact well with the result that the mass of material is generally air-permeable and/or develops air pockets; the net result in both instances being rapid mold growth. Consequently, in many operations, the wet corn bran, having a moisture content of about 65%, is dried to a moisture content generally below 20% and is then mixed with the corn steep liquor having a moisture content of about 50% and the resulting mixture is dried, in a flash drier or in a steam tube drier, to a moisture content of at most about 10%. This dried product is then sold as an animal feed supplement having a protein content of about 20%. (If corn bran per se is sold as a feed component it too is dried to a moisture content of less than 10% for the same reasons). However, that system has many disadvantages including the following:

1. The expenditure of a large amount of energy in drying the various components and the resulting product.
2. There may be extensive heat denaturation of the nutrients in the resulting product.
3. Valuable heat volatile and/or fine particulate nutrients in the mix being dried are lost by evaporation.
4. The importance of viable lactobacillus in warm-blooded animals in helping to maintain the proper balance of intestine flora has been documented and, indeed, viable lactobacillus is sold as a feed supplement for use in appropriate situations. Drying of the product substantially eliminates the lactobacillus viability thereby removing any possibility of the animals taking advantage of a potential valuable dietary component.

5. There is relatively large capital investment and costly maintenance in the drying equipment required.
6. Operation of the drying equipment results in a pollution problem comprising mainly particulate emissions and very undesirable odour emissions.
7. As in all such wet milling operations, if the drier for the animal feed product becomes inoperative, the whole milling process is been subject to shut-down.

Many ways of utilizing the by-products of the wet corn milling industry, and indeed, the wet wheat milling industry, have been proposed but, to Applicant's best knowledge, all leave a lot to be desired and all generally suffer from one or more of the above disadvantages. A major feature of the prior proposals is that the animal feed product is required to be dried to a relatively low moisture content immediately following its production. Refer for example to U.S. Pat. No. 4,181,748 which discloses a continuous process for refining whole grain corn. This complex process utilizes both a dry milling stage and a wet milling stage, this presumedly, requiring two complete mills since the theoretically possible sequential treatment route would result in a batch operation while the process is stated to be continuous. Moreover, the wet milling stage involves two steeping steps. Various fractions from both the dry milling and wet milling stages are combined to form a wet animal feed composite which, in the usual manner, is dried over a period of hours to form the desired animal feed product. In U.S. Pat. No. 4,171,353, there is disclosed a wet milling process for refining whole grain wheat, in which process again two steeping steps are used and a variety of product streams from the multistage process are combined to form a wet animal feed composite. The composite is then, in the usual manner, dried to a moisture content of from 10-12% by heating at elevated temperatures. A significant claim for this process is that all of the milling is wet milling to avoid damage to the substrate. Other known processes which suffer from similar disadvantages are described in U.S. Pat. Nos. 4,171,383 and 4,171,384. In summary, prior art attempts to use the by-products of wet milling processes have generally required changes to be made to the basic wet milling operation and/or have used a combination of wet and dry milling stages: however, the common feature associated with the various processes is that any wet animal feed composite resulting from such processes are required to be dried immediately, this merely reflecting the widely held industry view that such materials when wet would, invariably, be subject to spoilage within a very short time.

It is an object of the present invention to provide animal feed supplements which, from a practical viewpoint, are in, at most, a moist form, from the wet corn bran and corn steep liquor by-products of a wet corn milling process, which products are gravitationally and microbiogically stable.

A further object of the present invention is a process for the production of an animal feed supplement from wet corn bran and steep liquor which process is able to utilize those components and especially the wet corn bran in the quantities they are normally produced in any typical wet corn milling plant, the routine operation, and consequently efficiency, of which need not therefore be disrupted.

GENERAL STATEMENT OF INVENTION

It has now been found, and this finding forms the basis of the present invention, that corn steep liquor from a wet corn milling process has the ability when admixed with wet corn bran from the same process, to preserve the corn bran and thereby produce a valuable unfermented animal feed supplement having good keeping qualities.

A further major feature of the invention is that the corn bran as admixed with the steep liquor has a high moisture content—the water content of the bran exiting the usual corn wet-milling process is reduced to only an intermediate level prior to it being admixed—as does the feed produced, and this results in several major advantages including, for example, a significant energy saving in its production.

In a further aspect of the invention the product as formed above is subjected to an anaerobic fermentation stage during which the material is converted, without further drying, into a moist friable mass. The product is gravitationally and microbially stable and is a non-agglomerating mixture having no obvious undesirable "wet characteristics" in spite of the fact that it still has a substantial moisture content of greater than 50% by weight. Under normal conditions, there is no tendency for the feed component particles or the like either during the formation of the friable mass or subsequently following separation or division into smaller amounts, to stick or fuse together to form undesirable large indurated lumps and it is relatively easy to divide the mass as required. Consequently, the product may be readily transported via conventional transfer systems from its storage location to place of consumption. This ability of the mass of product produced by fermentation to be readily divided is described herein as its ability to be "readily reduced to a non-agglomerating product".

All animal feeds, whether fluid feeds or non-pelleted "solid" feeds are prone to component separation especially during distribution and, in the case of high moisture products as are the present products, during storage, this being caused at least in part because of the influence of gravity. In fluid feeds suspended solids tend to precipitate out and in solid feeds liquid components may separate from solid components and various solid components because, for example, of differing particle sizes may separate i.e. particles of the same general size (and usually same type of material) may come together. Such separation is obviously highly undesirable and an animal feed is said to be "gravitationally stable" if it has the ability to substantially resist such component separation during distribution and for an extended period of time and at least the projected life of the product; in this case at least several weeks but usually much longer.

DETAILED STATEMENT OF INVENTION

In one aspect, the present invention provides a process for producing a microbioligically stable unfermented animal feed supplement from corn steep liquor and wet corn bran exiting a wet corn milling process, comprising:

(a) mechanically dewatering the wet corn bran to a solids content of from 30% to 50% by weight;

(b) thoroughly admixing the de-watered bran with concentrated corn steep liquor having a solids content of from 40 to 55% preferably 45% to 55% by weight in the ratio of de-watered corn bran: steep liquor of from 3:1 to 1:2 with the resulting mixture having a solids content of from 35% to 50% by weight.

(c) compacting the resulting mixture to form a moist cohesive mass having a bulk density of from 50, preferably 55, to 65 lb/cuft, a pH of less than 4.5 and a protein content of at least 20% on a dry matter basis of the solids content.

The steep liquor: bran ratio is extremely important, if too low i.e. the amount of steep liquor is too low, then the bran will be subject to rapid deterioration as referred to above, and if too high retention of the liquid components with the mass will be adversely affected resulting in undesirable leaking i.e. separation at the storage location.

It has also been found that the uniquely high moisture content of the wet corn bran component greatly assists thorough mixing of the bran and steep liquor as well as the efficient compaction of the resulting mixture. This may be compared with predried bran exiting standard corn wet milling operations which is more resistant to wetting and tends to cake during mixing with other feed materials, this leading to uneven distribution and poor steep liquor penetration resulting in inferior keeping qualities. The extremely poor keeping qualities of wet corn bran, per se, have already be referred to above.

It must be emphasized that these advantages are obtained with a significant net reduction in energy compared with prior processes where mixtures of wet corn bran and corn steep liquor are dried to a very low moisture content (less than 10%) prior to admixing and subsequent drying of the resulting product.

Another advantageous feature of the above feed supplement is that it still contains nutritional components which are usually lost when the corn bran, and corn bran mixtures with steep liquor, etc. are dried as in prior art processes.

The above product is conveniently produced in the corn wet milling plant and trucked immediately to the customer. It may be noted that the desired degree of compaction may be obtained, at least partially, while the product is being handled during its supply to the customer, i.e. during the actions involved in truck loading and carting, and unloading and ensiling at the customer's premises. Additional compacting if required can be effected by tramping, rolling or the like. The product is intended to be used relatively soon following production, within a few days in general, by customers who are supplied on a regular basis with only relatively short time periods between deliveries.

However, in a further aspect, the present invention also provides a fermented feed supplement which has extended stability and keeping qualities. In this embodiment, the inventive unfermented feed composition described above is subjected to a natural fermentation stage under anaerobic conditions during which, it is converted into a friable fermented mass having a pH of less than about 4.5 which mass is gravitationally and microbially stable for a relatively extended period of time and readily reduced to a non-agglomerating product which is easily and conveniently handled.

The fermentation process proceeds rapidly at first and subsides as the pH level stabilizes, preferably at a value of 3.75 to 4.25. The fermentation process has generally commenced by about the third day following compacting of the components and, practically speaking, fermentation may be considered complete by about the seventh day. The resulting product will keep for prolonged periods of time provided it is undisturbed and extraction of portions thereof is effected using normal ensiling methods.

As will be appreciated the fact that the unfermented product can readily be converted into the fermented product provides the user with a high degree of flexibility. For example, if for some reason, a delivery of the unfermented feed supplement cannot be used as early as expected then it can be converted to the corresponding fermented product and no loss is incurred. Moreover, since nothing of significance nutritionally is lost during the fermentation stage, the user may, without changing the ration fed to his animals, begin feeding the unfermented feed composition and change to the fermented feed product or vice versa as desired.

It is believed that viable lactobacillus micro-organisms present in large numbers in the steep liquor, and not rendered inactive upon omitting the usual severe drying step, in combination with residual fermentable unextracted starches in the bran (which may comprise up to 15% by weight on a d.m. basis) result in a fermentation stage which is similar to a natural ensiling process yielding natural organic acids which lower the pH of the product and serve to enhance the preservation of the product.

It may be noted that the lactobacillus microorganism content in both the unfermented and fermented supplements of the present invention is always greater than 1000/gm compared with counts below 50/gm for the prior art corn bran - steep liquor co-dried material. It is pointed out that this highly desirable component is not merely an additive in the sense that it is separately added: its presence results directly from the inventive features of the present invention.

If desired other ingredients may be incorporated into the feed products of the present invention. For example, corn gluten meal which is normally sold as a separate dried feed ingredient may be incorporated in the products of the present invention and can significantly increase the protein content of final feed mixture.

Yet a further major advantage of the present invention is that it is fully able to utilize the steep liquor and wet corn bran etc. in the amounts and ratio substantially as is normally produced in the corn wet milling process. Therefore the only changes which are required to be made to the corn wet milling process and plant are the elimination of the steps, and associated equipment, required to prior dry the wet bran to a relatively low moisture level and, subsequently, extensively dry the resulting mixtures to the desired feed product. This results not only in a significant reduction in the energy required to produce the feed product but also leaves the beneficial lactobacillus content of the steep liquor substantially intact; and substantially reduces or eliminates the particulate and odour pollution aspects normally associated with the treatment of corn wet milling by-products.

As stated above, a major feature of the present invention is the finding that the natural keeping qualities of the corn steep liquor can be used to preserve the readily soluble corn bran. In some instances, the amount and quality (protein content, etc.) of the corn steep liquor may be in excess of that required to preserve the bran and to provide the resulting inventive product with the necessary protein content respectively. Feed products of this type are sold, mainly on the basis of their minimum protein content and increases in that protein level are not generally economically advantageous to producer. Consequently, in some instances the amount of corn steep liquor, which provides the major portion of starch in the product, produced may be in excess of that required to be combined with all of the bran produced in the same plant from the stabilization and/or protein level viewpoint. In those circumstances any such excess corn steep liquor may be sold separately, for example, as a high protein (greater than 40% d.m. basis) feed supplement or for other purposes. The economics of selling the steep liquor separately would depend on many factors, especially the capability of the specific plant in question to conveniently handle the liquid steep. In such a situation, the ratio of corn bran:steep liquor actually required to produce the desired product of the present invention having a selected protein content can be readily calculated by using, for example, a simple Pearson square calculation.

In this specification the term "wet corn bran" means the mixture of wet corn bran optionally combined with corn screenings or offal and/or corn germ meal produced in a separate by-product stream, the latter being incorporated if a high protein product is required.

A. The present invention will be further described, but not limited by, reference to the following specific descriptions of the invention as carried out utilizing the by-products of a various corn wet milling operation located in North America.

This plant located in Ontario, Canada, is a relatively small one which processes approximately 9,500 bushels (bus.) of corn per day. Theoretically, each bushel of corn yields the following amounts of by-products on a dry matter (d.m.) basis
corn steep liquor—3.5 lb./bu.
corn bran—5.1 lb./bu.

The theoretical crude protein on a lb. (d.m. basis)-/bus. is approximately 2.15 lbs and consequently comprises 25% of the dry matter contained in the bran and steep when combined.

These by-products were, of course, obtained in the wet state. The corn steep liquor was concentrated in the usual manner and the wet corn bran stream concentrated mechanically by treatment in a press and a centrifuge: the two components then had the following dry matter (d.m.) compositions:

|  | (a) Dry Matter | (b) Crude Protein |
| --- | --- | --- |
| corn steep | 48% | 44% of (a) |
| corn bran | 38% | 12% of (a) |

(The moisture content of the so-concentrated wet corn bran, namely 62%, may be compared with that of the prior art dried corn bran products containing less than 10%).

A batch consisting of approximately 15,545 kg was formed by mixing approximately 10,722 kg of the wet corn bran and 4,817 kg of the corn steep liquor in a turbolizer mixer (average residence time about 0.75 minutes) and the batch introduced directly into a truck. The loading time, if the bran and steep were utilized as produced by the plant, would have been approximately four (4) hours but this was reduced to 2.75 hours by prior filling of a surge bin with part of the wet corn bran and pumping the steep liquor from storage. The actual mixing rates were about 143 lb./min. of the bran and slightly more than 64 lb./min. of the steep, and the ratio of concentrated corn bran:corn steep liquor was about 2.2:1. The product was delivered immediately to a farm storage site, some of the required compaction occurring during transit and the remainder during unloading and ensiling at the storage site. The unfermented feed supplement was in the form of a cohesive mass having the following composition:

| Dry Matter | 38.58% |
| --- | --- |
| Crude Protein | 23.72% |
| pH | 4.5 |
| Bulk Density | 62 lbs./cuft |

Some of this product was utilized immediately as part of the daily ration for a beef herd.

The remaining product was maintained in an undisturbed condition and underwent a natural fermentation process which was substantially complete within seven (7) days resulting in a stabilized fermented product having approximately the composition of the unfermented product but having a pH of about 4; in its undisturbed condition, the product would remain unspoiled for an extended period of seven months or more.

Both the unfermented and fermented products according to the present invention were fed to the animals as a medium protein supplement and found immediate acceptance with total success.

As in all large scale operations involving the processing of natural products, there will generally be some variance in characteristics of the products and in particular, and by-products exiting the operation. This is true of the corn bran and steep liquor starting materials for the process of the present invention and variances within the following limits are commonly obtained:

|  | (a) Dry Matter | (b) Crude Protein |
| --- | --- | --- |
| Concentrated Corn Bran | 35–40 | 11–13 |
| Corn Steep Liquor | 45–50 | 43–45 |

Such variances, of course, could lead to variances in the crude protein content, etc. in the product and must be taken into account when selecting mixing ratios of bran and steep.

The above described corn wet milling plant is capable of producing about 3,800 kg/hr (8,500 lb/hr) of the unfermented product of the present invention at about the 40% d.m. basis.

Moreover, it may be noted that during the carrying out of the process of the present invention the milling plant operated substantially normally, the only significant changes concerning less than normal drying of the wet bran component and total elimination of the drying of the resulting feed mixture.

Using the general processing conditions described above a large number of batches comprising 15,000 to 16,000 kg (i.e. truckloads) of unfermented product were produced. The composition of the concentrated corn bran and the corn steep liquor starting materials fell with the variances given immediately above and the corn bran:corn steep liquor mixing ratio fell within the range of 3:1 to 1:1. As previously, the products as soon as they were prepared were delivered to the location where they were to be used. Full analyses of the products not available since they are not required commercially and consequently were not effected. However, in each instance the bulk density of the compacted product fell within the range of 55 to 65 lb./cuft and the lactobacillus count was 1000/gm

| Batch | D.M. | C.P. | pH |
| --- | --- | --- | --- |
| 7804 | 35.75 | 21.65 | 4.0 |
| 7767 | 44.22 | 25.43 | 4.5 |
| 7769 | 37.55 | 24.36 | 4.2 |

-continued

| Batch | D.M. | C.P. | pH |
|---|---|---|---|
| 7771 | 40.00 | 20.85 | 4.0 |
| 7556 | 40.25 | 23.04 | 3.9 |
| 014 | 48.31 | 24.8 | 4.1 |
| 7758 | 40.5 | 20.3 | 4.4 |

| Batch | D.M. | C.P. | pH | Ca | P | Fibre | Fat | Ash |
|---|---|---|---|---|---|---|---|---|
| 7504 | 40.0 | 26.9 | — | — | — | 6.3 | 0.09 | 7.37 |
| 288 | 41.8 | 20.5 | — | 0.05 | 1.01 | — | — | — |
| 289 | 39.9 | 23.7 | — | 0.09 | 1.33 | — | — | — |
| 7544 | 37.3 | 22.9 | — | — | — | 7.32 | — | — |

LACTOBACILLUS EVALUATION

An evaluation of a prior art corn gluten feed dried to the usual moisture content of less than 10% disclosed a Lactobacillus count of 35/g compared with a count of 1350/gm for a high moisture content (50% by weight) wet corn bran/corn steep liquor product.

EVALUATION OF pH

All pH values given in this specification were obtained using the following procedure:

10 g of animal feed product, or component thereof, was added to 100 ml of freshly boiled water (i.e. any dissolved $CO_2$ had been removed) the mixture was allowed to stand for at least 30 minutes and the pH was evaluated using a standard pH meter.

B. This plant is located in New York State and is larger than the plant referred to in A. The corn steep liquor was concentrated in the usual manner and the wet corn bran stream concentrated mechanically as in A.

(i) The two starting components had the following compositions:

|  | (a) Dry Matter | (b) Crude Protein |
|---|---|---|
| Corn Feed Liquor | 52.1 | 39.5 |
| Wet Corn Bran | 40.8 | 27.0 |

Note: The moisture content of the wet corn bran was 59.2 which, as indicated previously, is significantly higher than normal.

A batch consisting of approximately 33,660 lbs of the desired unfermented product was formed by mixing, over a period of 45 minutes 13,370 lbs. of corn steep and 20,290 lbs. of wet corn bran i.e. the ratio of the ratio of corn/bran:corn steep liquor being 1.51.:1.0. The resulting unfermented feed supplement was in the form of a cohesive mass having the following composition:

| Dry Matter | 38.9% |
|---|---|
| Crude Protein | 27.0% |
| pH | 3.85 |
| Bulk Density | 57.2 lbs/cuft. |

The product was shipped by truck directly to the consumer where constituted several weeks supply of protein supplement for a dairy herd. Both the unfermented and fermented products of the invention which resulted from this batch performed perfectly satisfactorily.

(ii) The two starting components had the following composition:

|  | (a) Dry Matter | (b) Crude Protein |
|---|---|---|
| Corn Steep Liquor | 52.1 | 39.5 |
| Wet Corn Bran | 40.8 | 12.8 |

Note: The moisture content of the wet corn bran was 50.2 which is significantly more than that of wet corn bran usually emanating from a wet corn milling operation.

A batch of approximately 33,460 lbs of the desired unfermented product was formed by thoroughing mixing on a continuous basis 11,370 lbs. of the corn steep liquor and 20,566 lbs. of the wet corn bran over a period of 55 minutes, the ratio of wet corn bran:corn steep being 1.74:1. The product was loaded into a truck and immediately transported to the customer. The unfermented feed supplement was in the form of a moist cohesive mass having the following composition:

| Dry Matter | 38.9% |
|---|---|
| Crude Protein | 26.9 |
| pH | 3.61 |
| Bulk Density | 5.72 lbs/cuft. |

The above batch constituted a 2-3 week supply for the dairy herd in question. Feeding comenced virtually immediately upon delivery and consequently, a portion of the feed supplement was utilized in the unfermented condition and the remainder, which remained in a undisturbed condition, was used in the fermented condition.

(iii) The starting components had the following composition:

|  | (a) Dry Matter | (b) Crude Protein |
|---|---|---|
| Corn Steep Liquor | 47.6 | 42.9 |
| Wet Corn Bran | 39.8 | 13.1 |

Note: Again, the relatively high moisture content of the corn wet bran should be noted.

A batch of approximately 33,560 lbs. of the desired unfermented product was produced by thoroughly mixing 12,678 lbs. of the corn steep liquor with 21,482 lbs. of the dewatered wet corn bran. The ratio wet corn bran:corn steep liquor was 1.77:1. Product was produced over a period of 60 minutes and loaded directly into a truck and immediately shipped to the customer, owner of a dairy herd. The unfermented product in the usual form of a moist cohesive mass had the following composition:

| Dry Matter | 40.5% |
|---|---|
| Crude Protein | 25.7% |
| pH | 3.61 |
| Bulk Density | 53.7 |

The batch constituted a 2-3 week supply for the here. As previously, both unfermented and fermented products of the invention were utilized as and when required with no adverse affects whatsoever.

All the products described in (i) (ii) and (iii) above had a lactobaccillus count in excess of 1000/gm.

The products described in (i) to (iii) above were commercial batches of products of the invention and representative of batches supplied on a continuous basis to customers. In most instances, the said products were selected for use in the animal diets by way of a "least cost" computer program system, the said protein supplements being selected over alternatives such as corn and soya bean meal thus confirming the cost effectiveness as well as nutritional and practical effectiveness of the products of the invention. Moreover, it should be noted that all the wet corn bran and the corn steep liquor emanating from the wet corn milling plant were utilized, as formed, in the practicing of the present invention. In other words, the rate of production of the animal feed supplement is easily variable to conform with the plant when operating at its greatest efficiency—a significant advantage.

FEEDING TRIALS

In feeding trials involving feeding Holstein steers (i.e. beef cattle), the product of the present invention, both unfermented and fermented indiscriminately, was found to be an excellent supplemental protein source for high corn silage diets. The trial involved a comparison with other protein supplements and the results in summary form are given in the following table:

| Feeding Holestein Steers: Trial 5. Value of Wet Corn Gluten Feed | | | | |
|---|---|---|---|---|
| | Urea | Raw Beans | Roasted Beans | Corn Gluten |
| Initial Weight, lb. | 209 | 202 | 205 | 198 |
| Current Weight, lb. | 544 | 61.7 | 656 | 651 |
| Daily gain, lb. | 1.86 | 2.31 | 2.51 | 2.52 |

As can be seen, the product of the present invention, termed "corn gluten" in the table, compared very favourably with competitive products and also has advantages from the viewpoint of cost. The products were typical products obtained using the detailed processes desribed immediately above in procedures (i) to (iii). For example, two typical batches had a dry matter values of 37.5 and 43.7 and crude protein values of 23.0% and 23.5% respectively and met the given criteria for other essential parameters such as bulk density etc. The product was delivered from the same plant to the use site on a batch basis, one batch every 2 to 3 weeks.

The embodiment of the invention in which an exclusive property or privilege is claimed are defined as follows:

1. A moist, fermentable, cohesive, friable, readily transportable animal feed supplement comprising an admixture of mechanically de-watered corn bran having a solids content of 30% to 50% by weight and a concentrated cornsteep liquor having a solids content of from 45% to 55% by weight, in a ratio of de-watered corn bran to corn steep liquor of 3:1 to 1:1, whereby the resulting admixture readily compacts under its own weight to a bulk density of from 50 to 65 lbs./cubic foot and has a pH of less than about 4.5, a solids content of from 35% to 50% by weight and a protein content of at least 20% on a dry matter basis.

2. An animal supplement as claimed in claim 1 wherein the admixture has a lactobacillus microorganism count greater than 1,000/gm.

3. An animal supplement as claimed in claim 1 wherein the solids content of the admixture is from 38% to 42%.

4. An animal supplement as claimed in claim 1 which ferments naturally to a pH less than 4.25.

5. An animal supplement as claimed in claim 1 wherein the protein content is from 10–30% on a dry matter basis.

* * * * *